(12) United States Patent  (10) Patent No.: US 9,001,629 B1
Yuan et al.  (45) Date of Patent: Apr. 7, 2015

(54) SYSTEMS AND METHODS FOR SUPPRESSING BACKGROUND ENERGY OF A WAVEGUIDE IN AN ENERGY ASSISTED MAGNETIC RECORDING SYSTEM

(71) Applicant: Western Digital (Fremont), LLC, Fremont, CA (US)

(72) Inventors: Hongxing Yuan, San Ramon, CA (US); Ronald L. Allen, San Jose, CA (US); Michael V. Morelli, San Jose, CA (US); Matthew R. Gibbons, San Jose, CA (US); Zhong Shi, Dublin, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 58 days.

(21) Appl. No.: 13/664,981

(22) Filed: Oct. 31, 2012

(51) Int. Cl.
*G11B 11/00* (2006.01)
*G11B 5/02* (2006.01)
*G11B 11/105* (2006.01)

(52) U.S. Cl.
CPC .................................. *G11B 11/105* (2013.01)

(58) Field of Classification Search
None
See application file for complete search history.

(56) References Cited

U.S. PATENT DOCUMENTS

| 7,272,079 | B2 | 9/2007 | Challener |
| 7,724,470 | B2 * | 5/2010 | Poon et al. ................. 360/125.3 |
| 7,729,085 | B2 * | 6/2010 | Jin et al. ......................... 360/59 |
| 8,169,881 | B2 | 5/2012 | Balamane et al. |
| 8,391,108 | B2 * | 3/2013 | Peng et al. .................. 369/13.33 |
| 8,675,455 | B1 * | 3/2014 | Krichevsky et al. ............ 360/59 |
| 2009/0097364 | A1 | 4/2009 | Tawa et al. |
| 2010/0165499 | A1 | 7/2010 | Stipe |
| 2010/0165822 | A1 | 7/2010 | Balamane et al. |
| 2012/0020194 | A1 | 1/2012 | Jin et al. |
| 2012/0084969 | A1 | 4/2012 | Tanaka et al. |

OTHER PUBLICATIONS

U.S. Appl. No. 13/399,250, entitled, "Systems and Methods for Increasing Media Absorption Efficiency Using Interferometric Waveguides".

* cited by examiner

*Primary Examiner* — Thang Tran
*Assistant Examiner* — Brian Butcher (57) ABSTRACT

Systems and methods for suppressing the background energy of a waveguide in an EAMR system are provided. One such system includes a near field transducer having a disk section and a pin section extending from the disk section to an air bearing surface of a slider, a waveguide having a core and a cladding, where the waveguide is configured to couple light energy to the near field transducer, where the cladding is configured to substantially surround the core, and a recess portion positioned between the core and the air bearing surface.

31 Claims, 5 Drawing Sheets

SYSTEMS AND METHODS FOR SUPPRESSING BACKGROUND ENERGY OF A WAVEGUIDE IN AN ENERGY ASSISTED MAGNETIC RECORDING SYSTEM

FIELD

The present invention relates generally to energy assisted magnetic recording (EAMR) systems for information storage devices, and more specifically to systems and methods for suppressing the background energy of a waveguide in an EAMR system.

BACKGROUND

Energy assisted magnetic recording (EAMR) or heat assisted magnetic recording (HAMR) technology is intended to be used to increase the areal density of information storage devices such as hard disks. In these assisted recording systems, a laser beam is delivered through an optical waveguide and interacts with a near field transducer (NFT) that absorbs part of the optical energy and forms a very strong localized electromagnetic field in the near field region. When the localized electromagnetic field is close enough to the recording medium, the recording medium absorbs part of the localized electromagnetic field energy and is thereby heated up thermally, which helps to realize the magnetic recording process.

For a typical EAMR system, the light coupler, the waveguide and the NFT are inserted between the reader and the writer of a slider. The light coupled from the attached external source (e.g., laser) propagates along the waveguide, and is concentrated to a small area close to an air bearing surface (ABS) of the slider that is adjacent to the NFT. The NFT is a strong absorber of the light wave at resonant status assisted by a surface plasmon effect, and is capable of squeezing the light energy to a very tiny area (e.g., as small as 40 nanometers). The NFT acts as a relay to deliver the concentrated energy to the tiny area of the recording layer of the media which is only several nanometers away and located within the near-field zone. Temporarily, the media is heated up and becomes magnetically soft thereby allowing the writing field to flip the magnetic storage characteristic of this tiny area to the desired bit data.

When the NFT works properly, the electric field around the NFT is much stronger than that found inside the waveguide. For example, the NFT electric field can be up to 3 times stronger than the waveguide electric field. However, due to the evanescent wave nature of the electric field of the NFT, the electric field drops significantly when it is delivered to the recording layer of the media. On the other hand, the coupling of light energy from the waveguide to the NFT is only a single digit percentage, and most light energy is kept confined inside the waveguide. As a result, an electric field from the waveguide (e.g., lobe) can be delivered to recording layer as well without much decay because of the propagation wave nature of the guided wave. In addition, the field size delivered from the waveguide is much bigger than that from the NFT (e.g., up to tens of times larger). So the energy density within the NFT pin interacting region in the recording layer is much higher than that of the waveguide mode interacting region. However, if the NFT does not function properly, the lobe effect will stand out such that the presence of a substantial lobe at the recording layer of the media can interfere with the energy delivery of the NFT and consequently the ability to properly record information in the media. As such, a system for partially or completely suppressing the lobe impact is needed.

SUMMARY

Aspects of the invention relate to systems and methods for suppressing the background energy of a waveguide in an EAMR system. In one embodiment, the invention relates to a system for suppressing background energy generated by a waveguide in energy assisted magnetic recording, the system including a near field transducer including a disk section and a pin section extending from the disk section to an air bearing surface of a slider, a waveguide including a core and a cladding, where the waveguide is configured to couple light energy to the near field transducer, where the cladding is configured to substantially surround the core, and a recess portion positioned between the core and the air bearing surface.

In another embodiment, the invention relates to a method for suppressing background energy generated by a waveguide in energy assisted magnetic recording, the method including providing a waveguide including a core and a cladding, where the cladding is configured to substantially surround the core, providing a recess portion positioned between the core and an air bearing surface of a slider, and providing a near field transducer including a disk section and a pin section extending from the disk section to the air bearing surface, where the waveguide is configured to couple light energy to the near field transducer.

DETAILED DESCRIPTION

Referring now to the drawings, embodiments of systems and methods for suppressing the background energy generated by a waveguide in an energy assisted magnetic recording (EAMR) system are illustrated. The improved EAMR systems include a near field transducer (NFT) with a portion extending to an air bearing surface (ABS) of a slider and a waveguide having a core and a cladding, where the waveguide core is recessed from the ABS by a preselected distance. In many embodiments, the recessed waveguide core and corresponding recess portion between the waveguide core and the ABS have the effect of suppressing the electric field (e.g., lobe) of the waveguide core at the recording layer of the adjacent media. In several embodiments, the recess portion is a component of the cladding surrounding the core. In other embodiments, the recess portion is made of a material different from that of the core and that has a refractive index less than a refractive index of the core.

Figure 9:
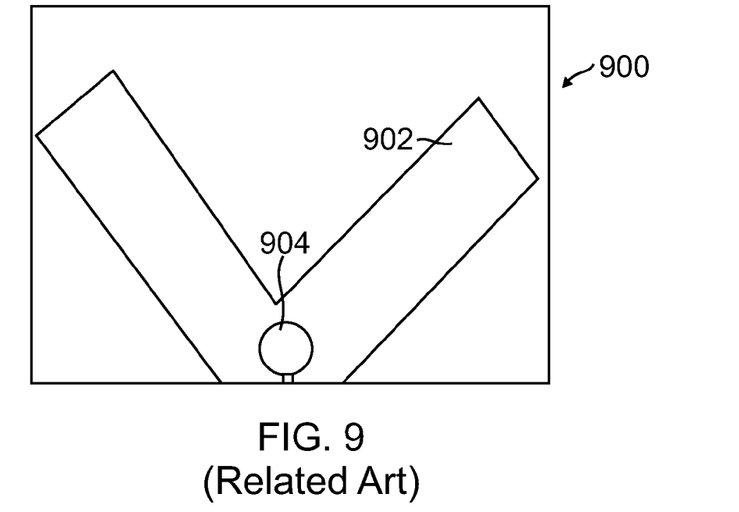
FIG. 9 is a cross sectional view of a non-recessed waveguide and an NFT of a related art EAMR system.
Figure 10:
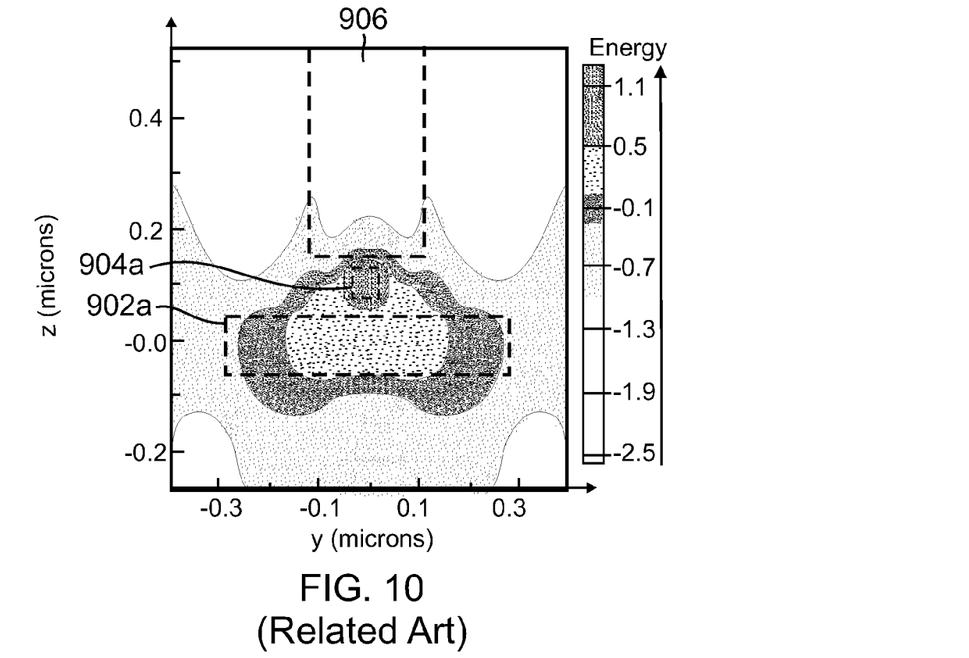
FIG. 10 is a plot of the optical energy field distribution in the middle of a recording layer of the media in log scale for the related art EAMR system of FIG. 9 with the non-recessed waveguide.
Figure 11:
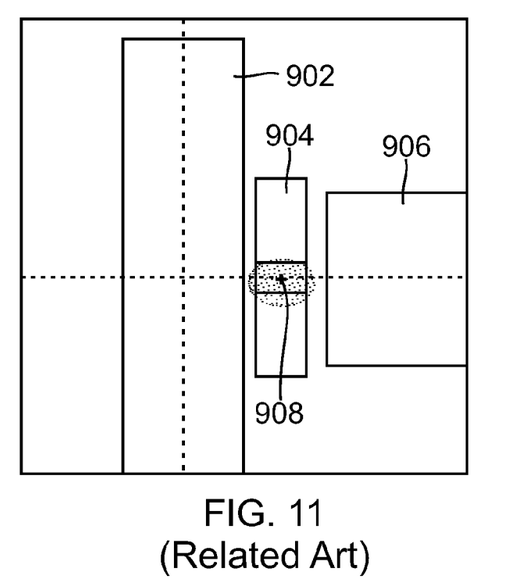
FIG. 11 is a plot of the thermal distribution of the related art EAMR system of FIG. 9 with the non-recessed waveguide illustrating the thermal energy density relative to positions of a waveguide, an NFT, and a write pole.

Before moving on to more of the details of the present invention, it is useful to consider a related art EAMR system. FIG. 9 illustrates a cross sectional view of a non-recessed waveguide 902 and NFT 904 of a related art EAMR system 900. FIG. 10 is a plot 901 of the optical energy field distribution in the middle of a recording layer of the media in log scale for the related art EAMR system 900 of FIG. 9 with the non-recessed waveguide. In FIG. 10, locations and sizes of areas representative of a writing pole 906, the NFT pin 904a and the waveguide core 902a are indicated with dashed lines on plot 901. The portion of the waveguide mode contribution is referred to as lobe 902a and is undesirably prominent beyond the area 904a corresponding to the NFT pin in FIG. 10. FIG. 11 is a plot of the thermal distribution of the related art EAMR system 900 of FIG. 9 with the non-recessed waveguide illustrating the energy density relative to positions of the waveguide 902, the NFT 904, and the write pole 906. A spot 908 centrally located on the NFT 904 illustrates a thermal peak of the related art EAMR system 900.

Figure 1:
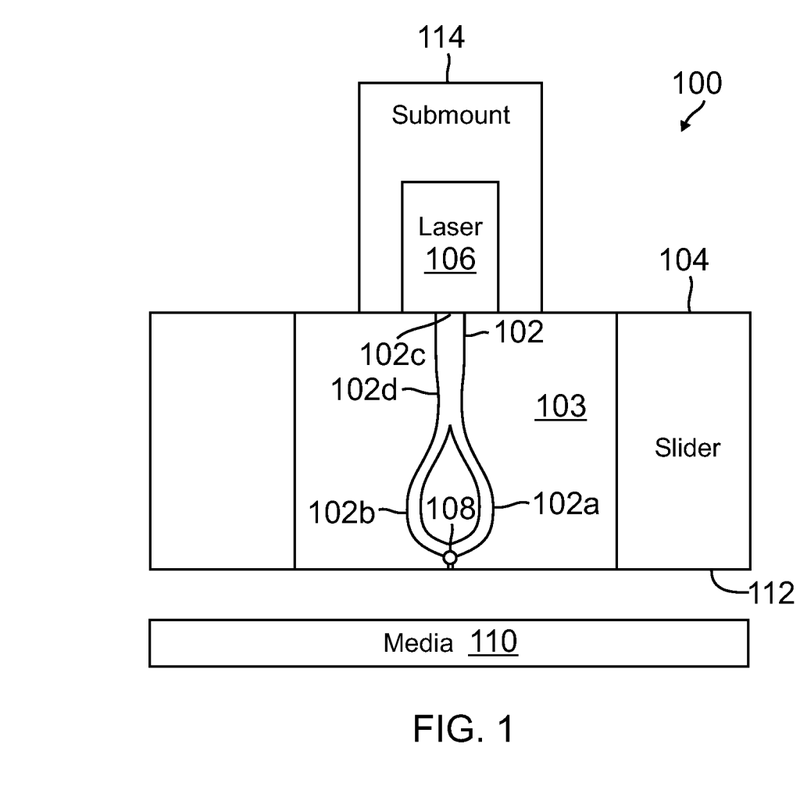
FIG. 1 is a front view of an energy assisted magnetic recording (EAMR) head assembly including a waveguide mounted to a slider and configured to receive light from a laser and to direct the received light to a near field transducer (NFT) that directs light energy on to a magnetic media, where the waveguide is recessed from an air bearing surface of the slider to suppress background energy generated by the waveguide in accordance with one embodiment of the invention.

In the related art EAMR system, typically light is provided from an external laser source (e.g., laser diode attached on slider) butt coupled with the assistance of mode converter and split into two balanced branches after the mode gets stabilized (see similar system illustrated in FIG. 1). By careful phase control of two waveguide arms (e.g., a different path length of the two arms, different core widths for the arms, a phase retarder over one arm or active phase control over one arm), a desirable constructive interference peak can be formed exactly under the NFT. With this configuration, the NFT coupling efficiency from the waveguide can be maximized. Whatever material property variation due to the variation of process conditions, the critical dimension fluctuation, back-end lapping uncertainty, NFT aging and so on will make the coupling weaker and NFT intensity around the pin will drop.

The lobe will stand out if the same NFT intensity is required for comparable bit amplitude by tuning the input power (e.g., should input power be increased to a level that ensures bit writability and thereby overcomes the weak NFT intensity, the lobe will also be increased). In such case, the safety gap between the NFT intensity and the lobe intensity can be narrower or even disappear, and thus the bit pattern will no longer be able to be controlled by the NFT pin size but will instead be substantially dominated by the lobe size. As a result, many of the advantages of the EAMR technology will be lost. Therefore, effective suppression or even total removal of the lobe can purify the environment for EMAR recording and make the system be substantially insensitive to intensity variation after equalization of the input power for different devices.

FIG. 1 is a front view of an energy assisted magnetic recording (EAMR) head assembly 100 including a waveguide consisting of a core 102 and a cladding 103 formed on a slider 104 and configured to receive light from a laser 106 and to direct the received light to a near field transducer (NFT) 108 that directs light energy on to a magnetic media 110, where the waveguide core 102 is recessed from an air bearing surface 112 of the slider 104 to suppress background energy generated by the waveguide (102, 103) in accordance with one embodiment of the invention. The laser 106 is mounted to a sub-mount 114, and the sub-mount 114 is mounted to a top surface of the slider 104. The cladding 103 surrounds the core 102 on, or possibly within, the slider 104, (e.g., formed by deposition on the slider).

In operation, light from the laser 106 is received at an upper waveguide core inlet 102c and then split into the first waveguide arm 102a and second waveguide arm 102b at an optical splitter 102d. Light travelling along one of the waveguide arms (e.g., the first waveguide arm 102a) can be delayed or advanced by the preselected phase difference using one or more of a number of techniques for controlling the phase difference and efficiently and constructively combines with the light from the second waveguide arm 102b at the NFT 108. Techniques for controlling the phase difference are described in U.S. patent application Ser. No. 13/399,250, entitled, "SYSTEMS AND METHODS FOR INCREASING MEDIA ABSORPTION EFFICIENCY USING INTERFEROMETRIC WAVEGUIDES", the entire content of which is incorporated herein by reference. The NFT 108 then converts the light energy into near-field electromagnetic energy and directs it into the media 110. At the recording layer of the media 110, the NFT energy can be used to facilitate writing/storing a bit of information. The waveguide core 102 is recessed from the ABS 112 by a preselected distance (not visible but see FIG. 2) such that the electric field generated therefrom (e.g., lobe) in the recording layer of the media 110 is substantially suppressed. This reduces or prevents a number of problems caused by the lobe, including adjacent track interference among other things.

In the embodiment of the EAMR assembly 100 of FIG. 1, the waveguide has a preselected symmetrical shape. In other embodiments, the waveguide can have other suitable shapes.

Figure 2:
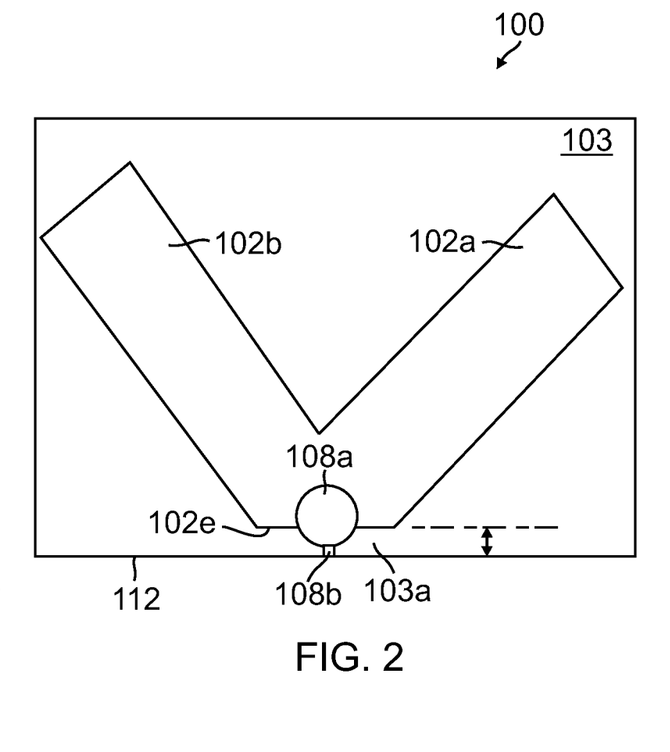
FIG. 2 is an enlarged front view of the recessed waveguide, the ABS, and the NFT of the EAMR system of FIG. 1 in accordance with one embodiment of the invention.

FIG. 2 is an enlarged front view of the recessed waveguide (102, 103), the ABS 112, and the NFT (108a, 108b) of the EAMR system 100 of FIG. 1 in accordance with one embodiment of the invention. The waveguide core (102a, 102b) is recessed from the ABS 112 by a preselected distance to form a recess portion 103a in the waveguide cladding 103. In other embodiments, the recess portion 103a can be a component that is separate from the cladding 103 and is optionally made of a material different from the material of the cladding 103. The NFT consists of a disk section 108a and a pin section 108b, where the pin section is attached to an area along the circumference of the disk section 108a and extends away from the disk section 108a to the ABS 112. Stated another way, the disk section can be thought of as having a rounded or circumferential edge, a first side, and a second side, where the first and second sides are substantially flat. In such case, the pin extends from a portion of the rounded edge in a direction substantially parallel to the first side.

Referring now to both FIGS. 1 and 2, and in many embodiments, the cladding 103 is made of one or more materials having a refractive index less than a refractive index of the one or more materials of the core 102. In one such embodiment, the waveguide core 102 is made of $Ta_2O_5$ and the cladding 103 is made of SiO2. Similarly, in many embodiments, the recess portion 103a is made of one or more materials having a refractive index less than a refractive index of the one or more materials of the waveguide core 102. In one embodiment, the NFT (108a, 108b) is made of Au, an alloy of Au, and/or other suitable materials.

In several embodiments, the waveguide core 102 is configured to generate a suppressed optical field in the media 110 which is positioned adjacent to the ABS 112 of the slider. In such case, a degree of suppression of the suppressed optical field is a function of a width of the recess portion 103a. In many embodiments, the NFT is configured to generate an optical field in the media, where a magnitude of the optical field of the NFT is substantially greater than a magnitude of the suppressed optical field of the waveguide core 102. In several embodiments, a degree of energy delivered by the NFT 108 to the media 110 is a function of a width of the recess portion 103a and a degree of optical coupling between the NFT 108 and the waveguide core 102. In several embodiments, for example, the width of the recess portion 103a is in a range from about 100 nanometers to about 240 nanometers. In one such embodiment, the width of the recess portion 103a is about 180 nanometers. In one embodiment, the disk section 108a has a diameter in a range from about 200 nanometers to about 240 nanometers, and the pin section 108b has a length in a range of about 10 nanometers to about 30 nanometers and a width in a range of about 20 nanometers to about 60 nanometers. In other embodiments, the recess portion and the NFT components can have other suitable dimensions.

In one embodiment, the width of the recess portion 103a is selected such that a preselected shape of the core 102 covers (e.g., extends to) less than half of the disk section 108a of the NFT, and the recess portion 103a covers the remaining portion of the disk section of the NFT. As can be seen in FIG. 2, the core (102a, 102b) forms a V-shape having a flat edge 102e that abuts the recess portion 103a at the region of the V-shape that would normally include the point of the "V". The flat edge 102e is substantially parallel to the ABS 112. In some embodiments, the flat edge 102e of the V-shaped core (102a, 102b) is further from the ABS 112 than a line extending across a diameter of the disk section 108a of the NFT, where the line extending across the diameter is substantially parallel to the ABS 112.

Figure 3:
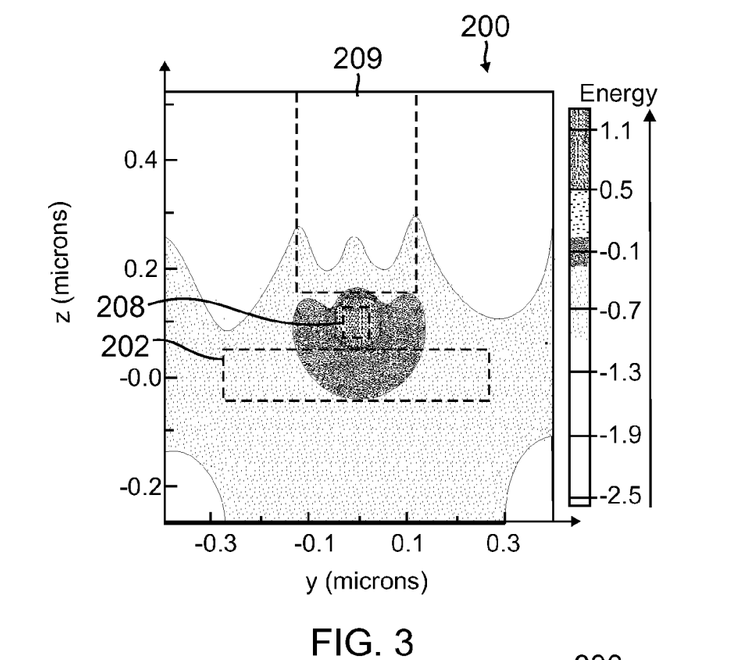
FIG. 3 is a plot of the optical energy field distribution in the middle of a recording layer of the media in log scale for an EAMR system with a recessed waveguide in accordance with one embodiment of the invention.

FIG. 3 is a plot 200 of the optical energy field distribution in the middle of a recording layer of the media in log scale for an EAMR system with a recessed waveguide in accordance with one embodiment of the invention. Locations and sizes of areas representative of the waveguide core 202, the NFT 208, and a writing pole 209 are indicated with dashed lines over the plot 200. As compared to the corresponding plot of the related art EAMR system shown in FIG. 10, the energy generated by the waveguide core 202 or lobe is substantially reduced or suppressed. As a result, magnetic recording in the media is primarily influenced by the contribution of the NFT optical energy 208 and can thus be more precise (e.g., effectively reducing or minimizing adjacent track interference).

Figure 4:
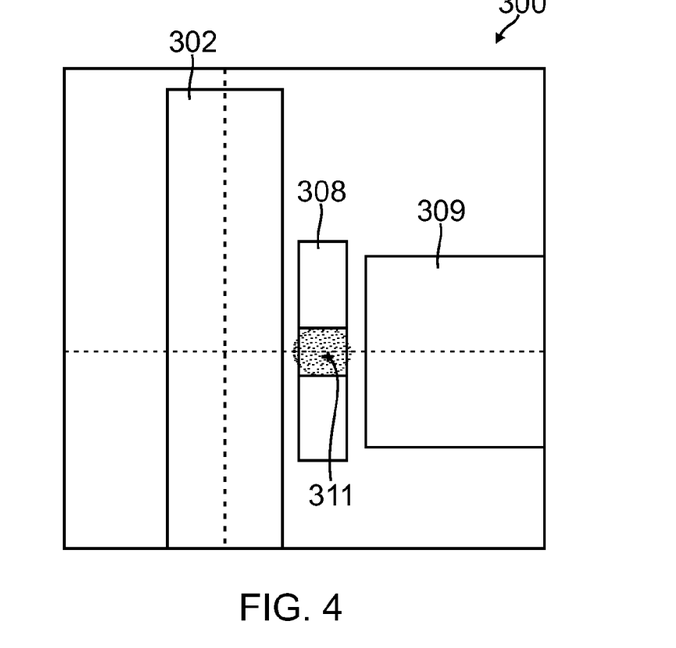
FIG. 4 is a plot of the thermal distribution of an EAMR system with a recessed waveguide illustrating the thermal energy density relative to positions of a waveguide, an NFT, and a write pole in accordance with one embodiment of the invention.

FIG. 4 is a plot 300 of the thermal distribution of an EAMR system with a recessed waveguide illustrating the thermal energy density relative to positions of a waveguide 302, an NFT 308, and a write pole 309 in accordance with one embodiment of the invention. A spot 311 somewhat centrally located on the NFT 308 illustrates a thermal peak of the EAMR system with the recessed waveguide. As compared to the thermal distribution plot of the related art EAMR system shown in FIG. 11, the thermal peak spot 311 is shifted closer to the writing pole 309 than the corresponding thermal peak spot 908 in FIG. 11. This shift towards the writing pole 309 provides a number of desirable characteristics, including shifting the temperature profile of the EAMR system with the recessed waveguide such that it is easier to write a bit of information than in the EAMR system with a non-recessed waveguide. In addition, the shift towards the writing pole 309 provides for better optical and thermal gradient close to a trailing edge of the writing pole where the writing process occurs. For magnetic recording, this higher thermal gradient results in better linear density and higher signal to noise. The shift can also make the effective Magnetic Thermal Offset (MTO) smaller, which is expected to result in better writing performance.

Figure 5:
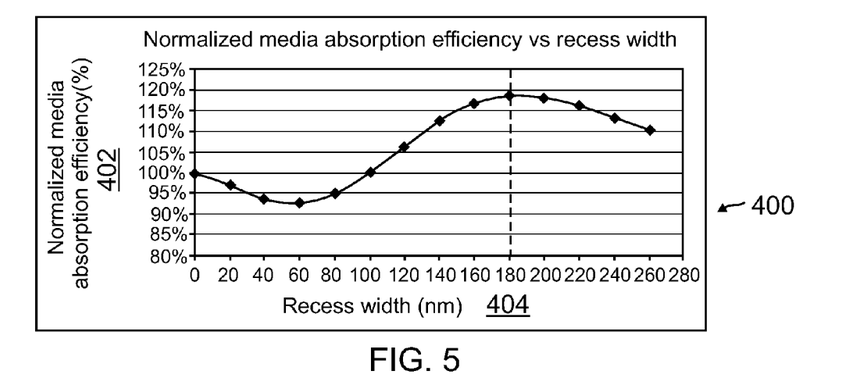
FIG. 5 is a graph of normalized media absorption efficiency versus recess width for an EAMR system with a recessed waveguide in accordance with one embodiment of the invention.

FIG. 5 is a graph 400 of normalized media absorption efficiency 402 versus recess width 404 for an EAMR system with a recessed waveguide in accordance with one embodiment of the invention. The media absorption efficiency can be thought of as a full width at half maximum measurement of light energy successfully delivered to the recording layer of the media. The point on the graph 400 in FIG. 5 where the recess width 404 is zero effectively corresponds to a EAMR system with a non-recessed waveguide and has a normalized media absorption efficiency of about 100 percent. When the recess width is about 180 nanometers, at roughly the maximum point of the graph 400, the normalized media absorption efficiency of the EAMR system with the waveguide recessed about 180 nanometers is improved to about 118 percent.

Figure 6:
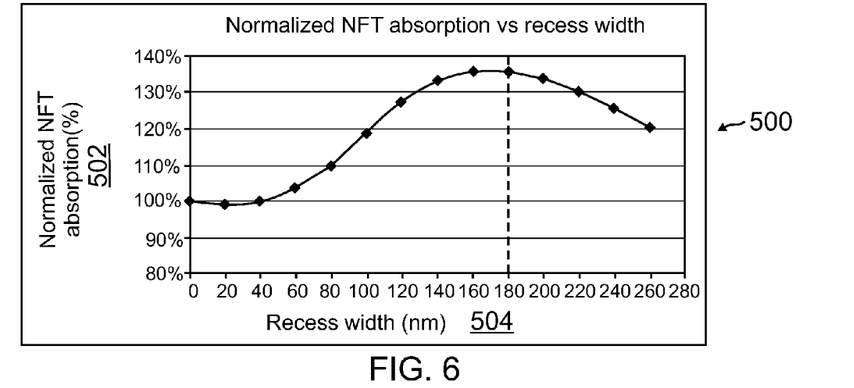
FIG. 6 is a graph of normalized NFT absorption versus recess width for an EAMR system with a recessed waveguide in accordance with one embodiment of the invention.

FIG. 6 is a graph 500 of normalized NFT absorption 502 versus recess width 504 for an EAMR system with a recessed waveguide in accordance with one embodiment of the invention. The normalized NFT absorption can be thought of as the amount of light coupling that takes place between the waveguide core and the NFT. The point on the graph 500 in FIG. 6 where the recess width 504 is zero effectively corresponds to a EAMR system with a non-recessed waveguide and has a normalized NFT absorption of about 100 percent. When the recess width is about 180 nanometers, at roughly the maximum point of the graph 500, the normalized NFT absorption of the EAMR system with the waveguide recessed about 180 nanometers is improved to about 135 percent. While this may seem a bit counterintuitive, it is noted that as the core is recessed or made smaller, the mode size increases and consequently NFT absorption is improved.

Figure 7:
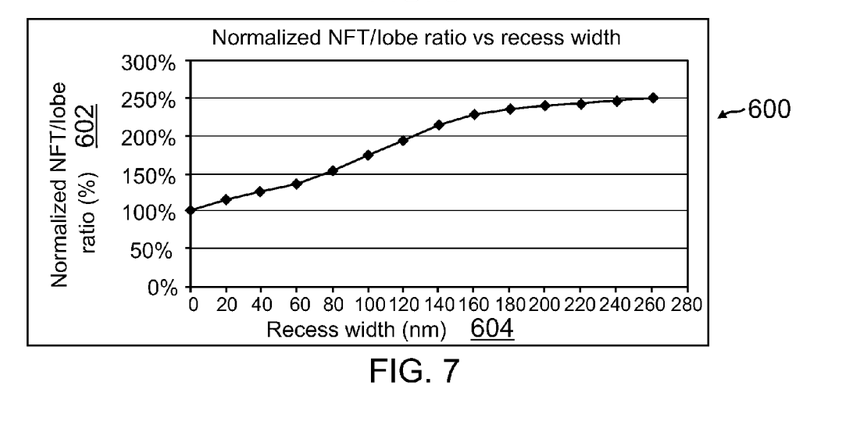
FIG. 7 is a graph of a normalized NFT energy to lobe energy ratio versus recess width for an EAMR system with a recessed waveguide, where the lobe energy is the energy contribution of the waveguide at the media in accordance with one embodiment of the invention.

FIG. 7 is a graph 600 of normalized NFT energy to lobe energy ratio 602 versus recess width 604 for an EAMR system with a recessed waveguide, where the lobe energy is the energy contribution of the waveguide at the media in accordance with one embodiment of the invention. The point on the graph 600 in FIG. 7 where the recess width 604 is zero effectively corresponds to a EAMR system with a non-recessed waveguide and has a normalized NFT/lobe ratio of about 100 percent. When the recess width is about 180 nanometers, at roughly the maximum points of the graphs of FIGS. 5 and 6, the normalized NFT/lobe ratio of the EAMR system with the waveguide recessed about 180 nanometers is improved to almost 250 percent or 2.5 times.

Figure 8:
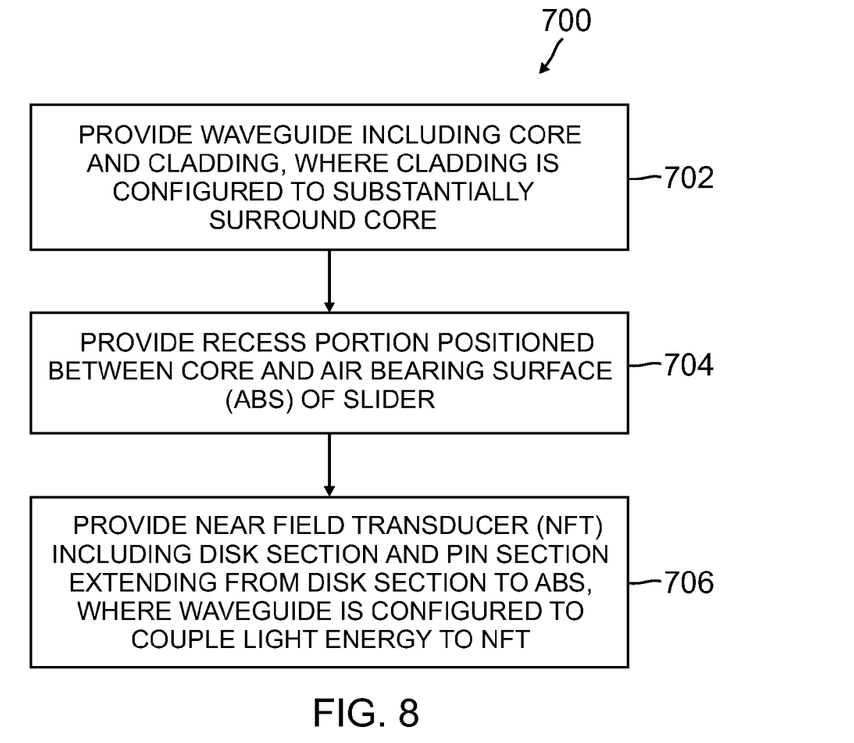
FIG. 8 is a flowchart of a process for manufacturing an EAMR assembly including a recessed waveguide in accordance with one embodiment of the invention.

FIG. 8 is a flowchart of a process 700 for manufacturing an EAMR assembly including a recessed waveguide in accordance with one embodiment of the invention. In particular embodiments, the process can be used to manufacture the EAMR assembly of FIGS. 1 and 2 with the recessed waveguide. The process first provides (702) a waveguide including a core and a cladding, where the cladding is configured to substantially surround the core. The process then provides (704) a recess portion positioned between the waveguide core and an air bearing surface (ABS) of a slider. In several embodiments, the recess portion is a component of the cladding. In other embodiments, the recess portion is not a component of the cladding. In several embodiments, the actions of the process in blocks 702 and 704 can include depositing a bottom cladding layer and then depositing a core material along with a recess portion material (e.g., depositing and patterning the recess portion using a mask or other suitable means). After such deposition, the process can perform a planarization sub-process and deposit a spacer layer.

The process then provides (706) a near field transducer (NFT) including a disk section and a pin section extending from the disk section to the ABS, where the waveguide is configured to couple light energy to the NFT. In several embodiments, the actions of the process in block 706 can include depositing and patterning the NFT on the spacer, depositing a first portion of a top cladding layer on an area substantially confined to the NFT, planarizing the work piece, and then patterning the core. In one embodiment, additional cladding material (e.g., a second portion of the top cladding layer) is deposited on the core and NFT after the core is patterned. In several embodiments, the process can include additional actions commonly associated with the formation of waveguides and NFTs as are known in the art.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A system to facilitate an energy assisted magnetic recording, the system comprising:
   a near field transducer comprising a disk section and a pin section, wherein the pin section extends from the disk section and terminates at an air bearing surface of a slider;
   a waveguide comprising a core and a cladding, wherein the waveguide is configured to couple light energy to the near field transducer, and wherein the cladding is configured to substantially surround the core; and
   a recess portion positioned between the core and the air bearing surface, wherein a width of the recess portion is selected to achieve a predetermined degree of suppression of background energy generated by the waveguide.

2. The system of claim 1, wherein a material of the core and a material of the recess portion comprise different materials.

3. The system of claim 2, wherein the material of the recess portion comprises a material having a refractive index less than a refractive index of the core.

4. The system of claim 3, wherein the cladding comprises a material having a refractive index less than a refractive index of the core.

5. The system of claim 1, wherein the core is configured to generate a suppressed optical field in a medium positioned adjacent to the air bearing surface of the slider, and wherein a degree of suppression of the suppressed optical field is a function of the width of the recess portion.

6. The system of claim 5, wherein the near field transducer is configured to generate an optical field in the medium, wherein a magnitude of the optical field of the near field transducer is substantially greater than a magnitude of the suppressed optical field of the core.

7. The system of claim 1, wherein a degree of energy delivered by the near field transducer to a medium adjacent to the air bearing surface is a function of the width of the recess portion and a degree of optical coupling between the near field transducer and the core.

8. The system of claim 1, wherein the width of the recess portion is in range from about 100 nanometers to about 240 nanometers.

9. The system of claim 1, wherein the disk section comprises a diameter in a range from about 200 nanometers to about 240 nanometers, and wherein the pin section comprises a length in a range of about 10 nanometers to about 30 nanometers and a width in a range of about 20 nanometers to about 60 nanometers.

10. The system of claim 1:
    wherein the disk section comprises a rounded edge, a first side, and a second side;
    wherein the first and second sides are substantially flat; and
    wherein the pin section extends from a portion of the rounded edge in a direction substantially parallel to the first side.

11. The system of claim 1, wherein the width of the recess portion is selected such that a preselected shape of the core covers less than half of the disk section of the near field transducer, and the recess portion covers the remaining portion of the disk section of the near field transducer.

12. A system for suppressing background energy generated by a waveguide in energy assisted magnetic recording, the system comprising:
    a near field transducer comprising a disk section and a pin section extending from the disk section to an air bearing surface of a slider;
    a waveguide comprising a core and a cladding, the waveguide configured to couple light energy to the near field transducer, and the cladding configured to substantially surround the core, wherein the core comprises a V-shape having a flat edge at the point of the V-shape, and wherein the flat edge is substantially parallel to the air bearing surface; and
    a recess portion positioned between the core and the air bearing surface.

13. The system of claim 12, wherein the flat edge of the V-shape is further from the air bearing surface than a line extending across a diameter of the disk section of the near field transducer, and wherein the line extending across the diameter is substantially parallel to the air bearing surface.

14. The system of claim 1, wherein the recess portion is a component of the cladding.

15. A method to facilitate an energy assisted magnetic recording, the method comprising:

providing a waveguide comprising a core and a cladding, wherein the cladding is configured to substantially surround the core;

providing a recess portion positioned between the core and an air bearing surface of a slider, wherein a width of the recess portion is selected to achieve a predetermined degree of suppression of background energy generated by the waveguide; and providing a near field transducer comprising a disk section and a pin section, wherein the pin section extends from the disk section and terminates at the air bearing surface, and wherein the waveguide is configured to couple light energy to the near field transducer.

16. The method of claim 15, wherein a material of the core and a material of the recess portion comprise different materials.

17. The method of claim 16, wherein the material of the recess portion comprises a material having a refractive index less than a refractive index of the core.

18. The method of claim 17, wherein the cladding comprises a material having a refractive index less than a refractive index of the core.

19. The method of claim 15, wherein the core is configured to generate a suppressed optical field in a medium positioned adjacent to the air bearing surface of the slider, and wherein a degree of suppression of the suppressed optical field is a function of the width of the recess portion.

20. The method of claim 19, wherein the near field transducer is configured to generate an optical field in the medium, wherein a magnitude of the optical field of the near field transducer is substantially greater than a magnitude of the suppressed optical field of the core.

21. The method of claim 15, wherein a degree of energy delivered by the near field transducer to a medium adjacent to the air bearing surface is a function of the width of the recess portion and a degree of optical coupling between the near field transducer and the core.

22. The method of claim 15, wherein the width of the recess portion is in range from about 100 nanometers to about 240 nanometers.

23. The method of claim 15, wherein the disk section comprises a diameter in a range from about 200 nanometers to about 240 nanometers, and wherein the pin section comprises a length in a range of about 10 nanometers to about 30 nanometers and a width in a range of about 20 nanometers to about 60 nanometers.

24. The method of claim 15:
wherein the disk section comprises a rounded edge, a first side, and a second side;
wherein the first and second sides are substantially flat; and
wherein the pin section extends from a portion of the rounded edge in a direction substantially parallel to the first side.

25. The method of claim 15, wherein the width of the recess portion is selected such that a preselected shape of the core covers less than half of the disk section of the near field transducer, and the recess portion covers the remaining portion of the disk section of the near field transducer.

26. A method for suppressing background energy generated by a waveguide in energy assisted magnetic recording, the method comprising:
providing a waveguide comprising a core and a cladding, the cladding configured to substantially surround the core, wherein the core comprises a V-shape having a flat edge at the point of the V-shape, and wherein the flat edge is substantially parallel to the air bearing surface;
providing a recess portion positioned between the core and an air bearing surface of a slider; and
providing a near field transducer comprising a disk section and a pin section extending from the disk section to the air bearing surface, wherein the waveguide is configured to couple light energy to the near field transducer.

27. The method of claim 26, wherein the flat edge of the V-shape is further from the air bearing surface than a line extending across a diameter of the disk section of the near field transducer, and wherein the line extending across the diameter is substantially parallel to the air bearing surface.

28. The method of claim 15, wherein the recess portion is a component of the cladding.

29. The method of claim 15:
wherein the cladding comprises a bottom cladding and a top cladding,
wherein the providing the waveguide comprising the core and the cladding comprises:
depositing the bottom cladding; and
depositing the core on a portion of the bottom cladding,
wherein the providing the recess portion positioned between the core and the air bearing surface of the slider comprises:
depositing and patterning the recess portion on a portion of the bottom cladding adjacent to the core; and
depositing a spacer on the core and the recess portion, and
wherein the providing the near field transducer comprising the disk section and the pin section extending from the disk section to the air bearing surface comprises:
depositing and patterning the NFT on the spacer;
depositing a first portion of the top cladding on the NFT;
patterning the core; and
depositing a second portion of the top cladding on the core and the NFT.

30. The system of claim 1, wherein the disk section comprises a perimeter having a first point that is further from the air bearing surface than all other points defining the perimeter, and wherein the core is closer to the air bearing surface than the first point.

31. The method of claim 15, wherein the disk section comprises a perimeter having a first point that is further from the air bearing surface than all other points defining the perimeter, and wherein the core is closer to the air bearing surface than the first point.

* * * * *